United States Patent [19]
Morton

[11] Patent Number: 6,076,363
[45] Date of Patent: Jun. 20, 2000

[54] RECREATIONAL VEHICLE REFRIGERATOR HEAT CONTROL SYSTEM

[76] Inventor: John C. Morton, 1134 Starlite La., Yuba City, Calif. 95991

[21] Appl. No.: 08/777,284

[22] Filed: Dec. 27, 1996

[51] Int. Cl.[7] .............................. F25D 17/00; F25D 17/06
[52] U.S. Cl. .................................. 62/89; 62/181; 62/428; 454/239
[58] Field of Search .............................. 62/181, 428, 332, 62/89; 236/49.3; 454/239, 253, 258, 343

[56] References Cited

U.S. PATENT DOCUMENTS

| | | | |
|---|---|---|---|
| 1,886,607 | 11/1932 | Van Deventer | 62/181 |
| 3,390,538 | 7/1968 | Miller | 62/181 |
| 5,291,749 | 3/1994 | Schulak | 62/428 X |

*Primary Examiner*—William Wayner
*Attorney, Agent, or Firm*—Mark C. Jacobs, Esq.

[57] ABSTRACT

A heat exhaust system for installation in the space behind the refrigerator of a recreational vehicle for disposal of heat that builds up behind an RV refrigerator from the operation thereof. The system operates automatically to turn on a fan to dissipate the heat at a predefined high temperature, and operates automatically at a predefined low temperature to turn off the fan thereof.

13 Claims, 3 Drawing Sheets

RECREATIONAL VEHICLE REFRIGERATOR HEAT CONTROL SYSTEM

FIELD OF THE INVENTION

This invention relates to a temperature controlled heat exhaust system for the disposal of hot air that accumulates as an outcast from the refrigerator's condenser, in the space between the rear of a refrigerator employed in a recreational vehicle and interior surface of the wall of the compartment housing the refrigerator.

BACKGROUND OF THE INVENTION

The plentiful supply of gasoline, albeit at high prices, and the relaxation of the speed limit constraints have driven Mr. and Mrs. RVer back to the Interstate Highway System. More and more Americans and Canadians have been buying bigger and more luxurious Recreational Vehicles (RVs). These RVs generally have a kitchen facility which includes a refrigerator, which can be powered by any and all of 12 volt battery, 110 volt house current available in RV parks, and a fluid, such as propane or perhaps natural gas. These RV refrigerators are disposed within a compartment which is open in the front, and has abutting sidewalls, and abutting top and bottom walls. A rear wall closes off the compartment.

No matter which one or more power means is employed, heat builds up in the area of the storage compartment behind the refrigerator during periods of operation; i.e., between the rear wall of the refrigerator and the interior surface of the exterior wall of the coach. The retention of this heat can be detrimental to the longevity of the life of the food in the refrigerator. The stored food will spoil if not kept at about 40 degrees Fahrenheit in the refrigerator section, and at about 0 degrees Fahrenheit in the freezer section. Since the efficiency of the condenser of the refrigerator to dissipate heat, which is the same as creating cold, affects the temperature of the food, there is a need to get rid of the built up heat behind the refrigerator during periods of use, as this retained heat detrimentally affects the efficiency of the condenser and thus the interior temperature(s) of the refrigerator of the RV.

Applicant is aware of some manually actuated switch system that have been marketed to dissipate this retained heat. However, Mr. or Mrs. RVer sometime forget to either turn on or to turn off such manually actuated systems, with the result that after shutdown of the RV subsequent to the completion of a journey, the exhaust system which runs off the 12-volt power system of the RV oftentimes stays on and then runs down the battery to a full discharge state.

There is a need therefore for a system which will exhaust the heat built-up during the RV's refrigerator's operational period, but which will automatically shut off whenever the refrigerator itself is turned off, and which system will automatically turn on whenever the refrigerator is operational. Thus the actuation system should be keyed to the operation of the refrigerator, rather than to the mobility or immobility of the RV.

Applicant investigated the patent literature on this topic and the following patents turned up during the course of a search:

| | |
|---|---|
| 2,562,286 | M. R. Wall |
| 2,705,404 | H. S. Malutich |
| 2,734,441 | E. C. Williams |
| 3,444,698 | J. L. Lorenz |
| 3,717,010 | Slattery |
| 4,864,269 | Priebe |
| 5,228,307 | Koce |
| 5,355,693 | McConnell et al. |

None of these patents either singly or in combination anticipates or renders obvious the subject matter of this invention.

It is an object therefore to provide a dual switch system to control dissipation of heat build-up behind an RV refrigerator.

It is another object to provide a switch system that is retrofittable to presently existing RV refrigerators.

It is yet another object to provide a switching system to dissipate the heat behind an RV refrigerator that will automatically turn on and automatically shut down thereby preventing 12 volt battery discharge.

Other objects of the invention will in part be obvious and will in part appear hereinafter.

The invention accordingly comprises the device possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

SUMMARY OF THE INVENTION

A heat exhaust system comprising a temperature controlled fan for disposal of heat behind an RV refrigerator. The system operates automatically to turn on and exhaust the heat at a predefined high temperature, and operates automatically at a predefined low temperature to turn off the fan thereof when the heat confined behind the refrigerator is reduced to a predefined level. The actuation system ceases to function when the refrigerator itself is turned off, no matter the temperature of the air behind the refrigerator.

By creating a lower temperature air zone behind the refrigerator, the efficiency of the operating condenser,— which is basically a heat transfer device is increased—, thereby permitting the condenser to throw off more heat, and thus lower or maintain the internal temperature of the refrigerator at or close to the desired 40 degrees for stored food and 0 degrees for frozen food.

DESCRIPTION OF THE PREFERRED EMBODIMENT

For the benefit of the reader who may be uninformed about the use of operation of recreational vehicles, a brief introduction into the living operation is offered. Most RVs are fully self-contained. That is, they include food storage and food cooking facilities as well as a full bathroom facility. The use of the refrigerator of the RV is not confined to times that the vehicle is on the highway. It can be used for food storage during trip preparation, just prior to leaving on a journey, during the course of highway travel, while the vehicle is at rest as at the beach or at at rest at a suitable parking facility such as an RV park which probably has a power hookup, and subsequent to a trip's completion, during off loading of luggage et cetera. The power source employed may be different during the course of the presence of the vehicle at these several locations. Thus at the beach, fluid fuel would be used, in the RV park 110 VAC, and on the road the 12 VDC system would be used as the fuel source for the refrigerator.

Figure 1:
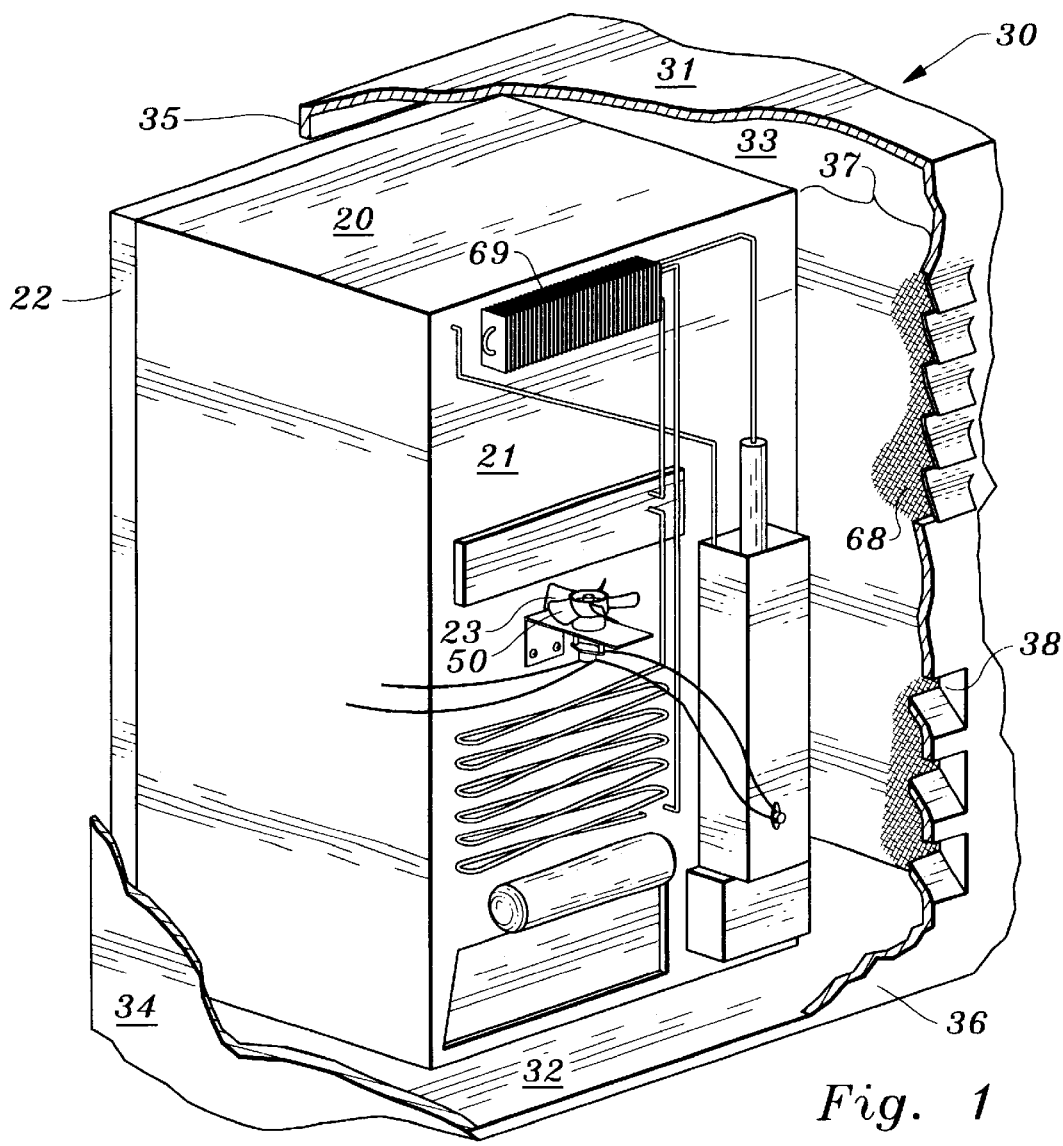
FIG. 1 is a cutaway side perspective view of the refrigerator compartment in a typical recreational vehicle, with the refrigerator therein.

In FIG. 1 there is seen a typical RV refrigerator, 20 which may be of at least bar size, and perhaps up to about 10 cubic feet in size. No matter the size they all work in generally the same manner. That is they are powered by one or more of 110 volt AC during periods when the RV is at an RV park or in residence at someone's abode; 12 volt DC when running off the vehicle's battery, and a gas such as propane or natural gas. For safety sake it is recommended that gas only be used when the vehicle is stationary.

Refrigerator 20 which has a rear wall 21 and an openable door 22, is seen to be disposed within a compartment 30. This enclosure has abutting top and bottom walls, 31 and 32 and abutting sidewalls 33 and 34 normal to the top and bottom walls. The compartment has a spaced rear wall 36 and is open at the front. It is within the space or area 37 behind the refrigerator that heat, which arises as a result of the heat transfer operation of the refrigerator's condenser,69, which condenser coil is mounted on the rear of the refrigerator per FIG. 4, builds up. The heat builds up because the air to be exhausted by the fan 23, wherever the fan may be mounted for exhaust, is not doing its job as it may not have been manually indirectly actuated. For ease and convenience, the fan is depicted in FIG. 1 as being mounted on the back wail of the compartment,36. In point of fact while the air inlet 38, to area 37 is always on the sidewall 36 of the RV at an elevation near the bottom of the refrigerator, the air outlet or exhaust may take place through a grill or stack to dispose of the hot air. In such an instance, it is preferred to mount the fan 50 directly to the rear wall 21 of the refrigerator. Of course, no matter where the fan is mounted the operating principles of both the prior art and this invention are unaffected.

Figure 2:
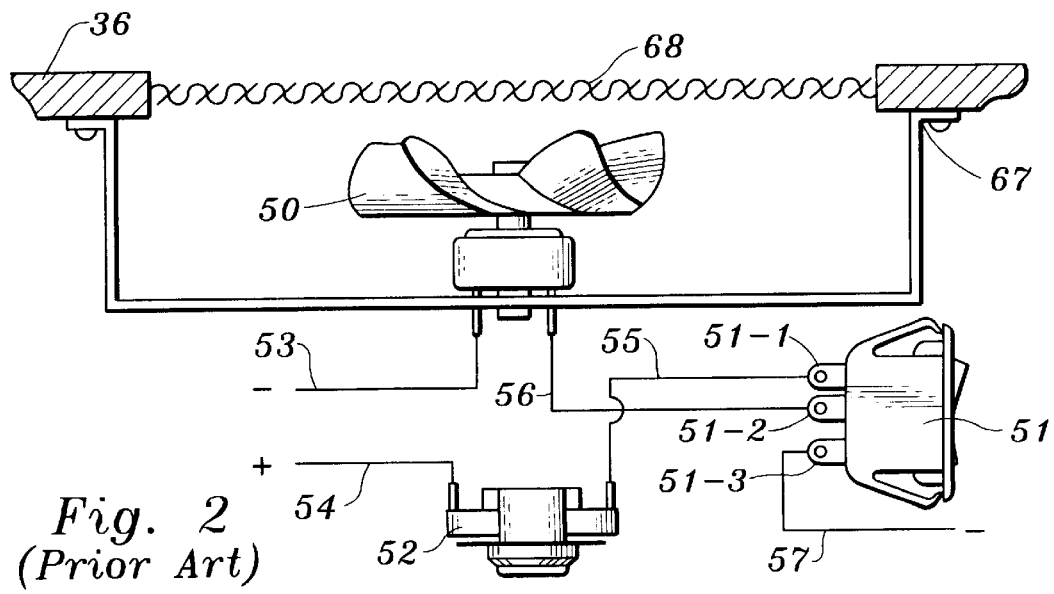
FIG. 2 is a combination top plan view and circuit diagram of a manually operated thermal switching system of the prior art.

To alleviate the heat build-up a manually operated exhaust system that uses a snap-disk thermostat was conceived and has been marketed. This system uses a 12 VDC fan 50 mounted to a bracket 67 which in turn is disposed against the side wall 36 of the RV. See FIG. 2. Other alternate mount means are also employed by skilled artisans in the field. Depending upon where the fan is actually mounted, and the mode of evacuation, an optional screen 68 may be employed.

In this system of the prior art, a manual rocker switch 51 is manually turned on by the RV user, when the refrigerator is turned on. Switch 51 is electrically connected by a wire 56 on its middle terminal, 51-2 to the "+" side of the fan. Terminal 51-1 is connected to one side of a thermo switch by wire 55. The opposite side of the thermo switch is connected by wire 54 to a power source, unseen. Wire 53 from ground is connected to the (−) side of the fan. Wire 57 from terminal 51-3 is also connected to ground.

Assuming the operator turned on switch 51 when the refrigerator such as 20 is activated, the fan 50 will exhaust the heat which has built up when the thermo switch completes the circuit at its predefined temperature which is usually about 110 degrees F. When the temperature in space 37 cools down to about 90 degrees F., the thermo switch deactivates causing the fan to turn off.

A problem of great magnitude can arise, when the RV is parked, during periods of hot weather, and refrigerator is turned off, if the user has failed to turn off the MANUAL switch 51. The switch system continues to draw current from the 12 volt battery system of the vehicle until the battery power source is drained. This is because, even with the refrigerator turned off, there can still be a large accumulation of hot air in space 37, and the switch system of the prior art being still active will continue to exhaust the heated air, until such time as the 12 VDC battery is discharged. The instant invention came about to prevent RVers from suffering a drained battery by accident.

Figure 4:
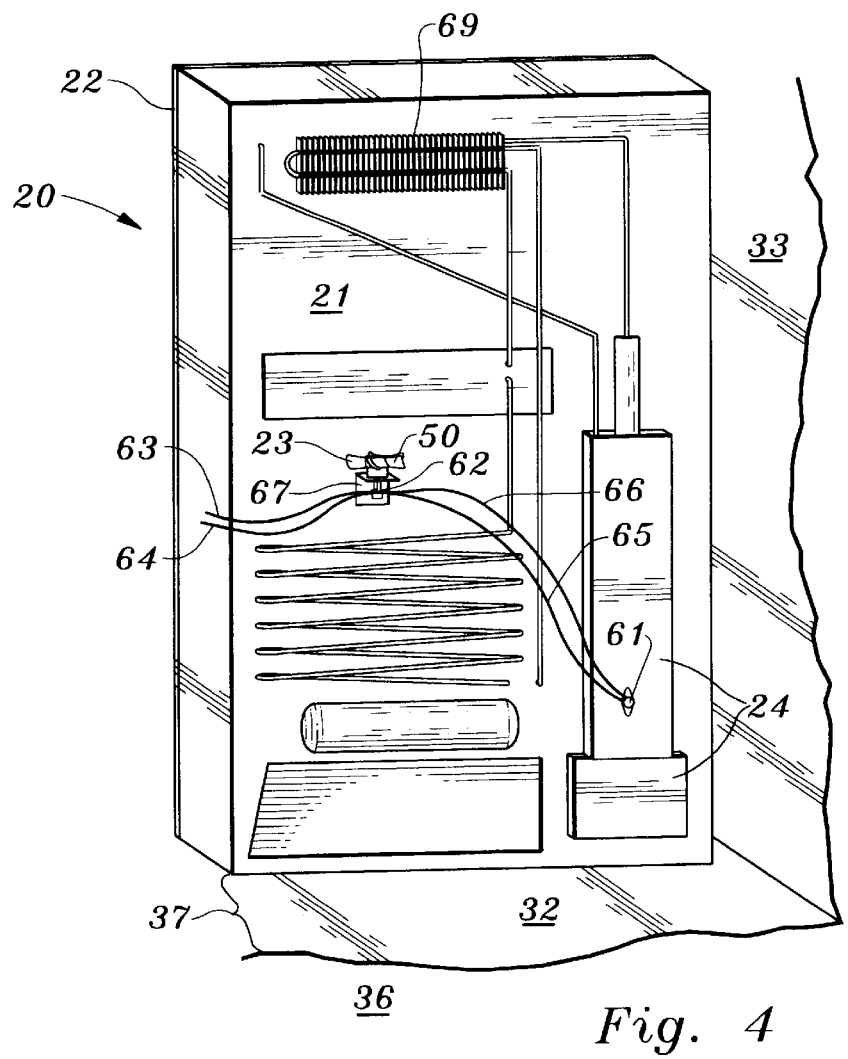
FIG. 4 is a rear exploded, partial cutaway view showing the placement of the elements of this invention relative to the rear of refrigerator of an RV.
Figure 5:
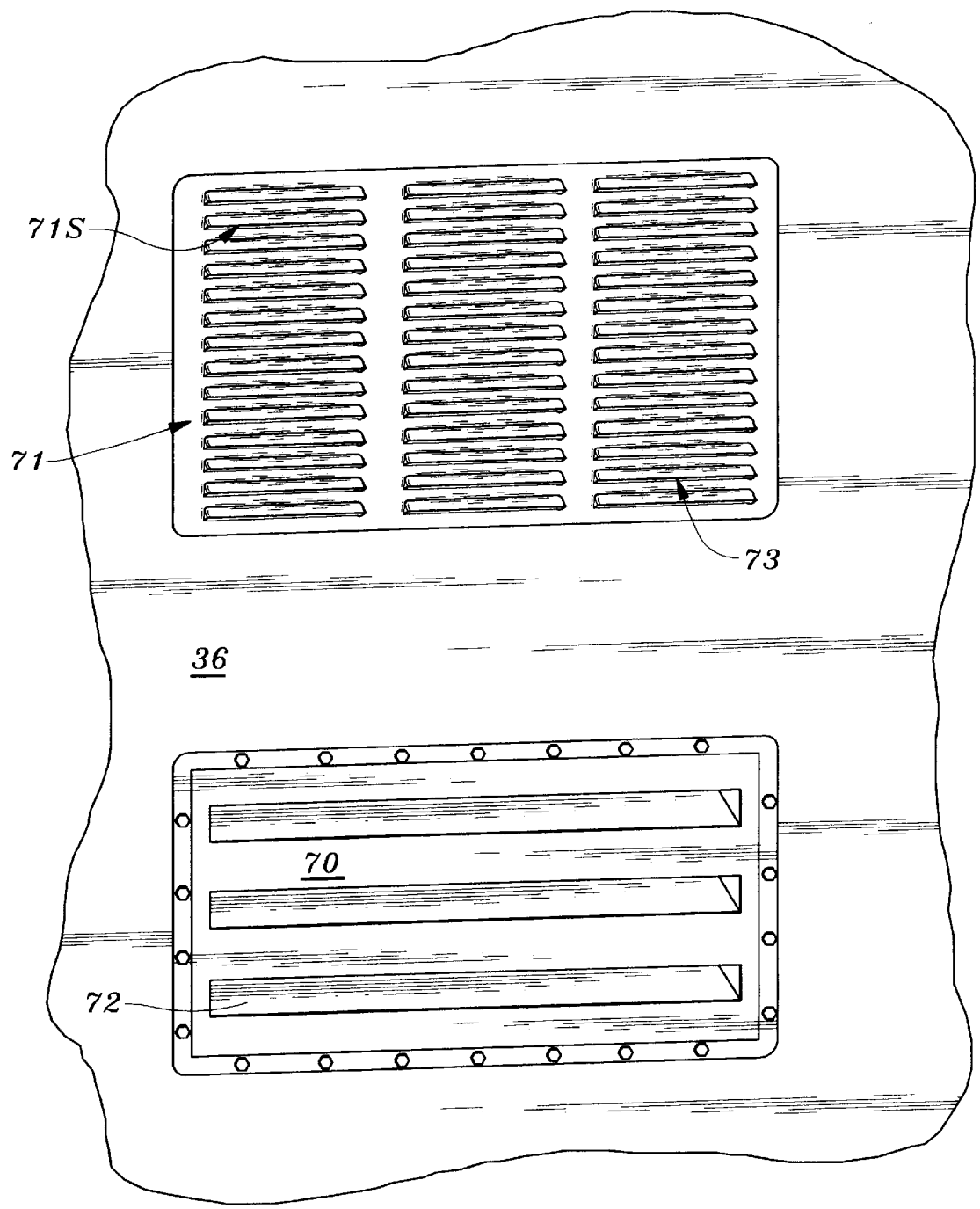
FIG. 5 is an elevational view depicting a typical air inlet grill (lower) and air outlet grill (higher) installation on the side wall of an RV spaced from the refrigerator disposed behind the grills.

As noted from FIG. 1, the refrigerator 20 is mounted in its cabinet spaced from usually the side wall, such as 36 of the RV to permit airflow. Reference is made to FIG. 5 which is an exterior view of the portion of the vehicle's side wall 36, which is in essence the rear wall in the space behind the refrigerator in FIG. 1. An air inlet means; namely lower disposed grill 70 having a trio of inwardly directed vents for the inflow is air is shown. An air outlet means; namely upper grill 71 having outwardly directed vanes 73 and slots 71S, is also shown. The inlet grill is positioned near the heater element of the refrigerator while the outlet grill is positioned near the condenser of the refrigerator as per FIG. 4. Grill 70 serves the same function as inlet 38 of FIG. 1.

Figure 3:
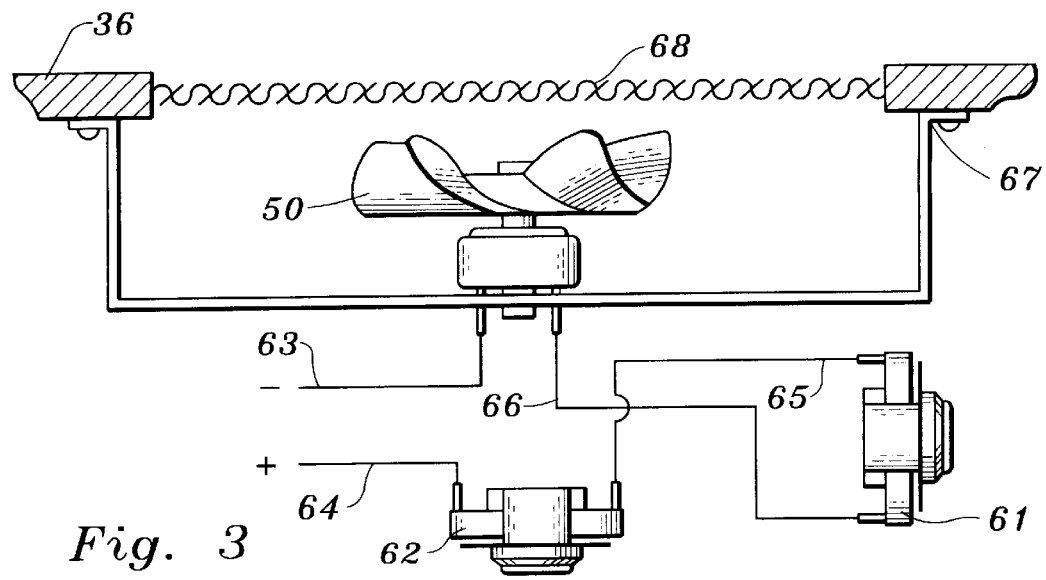
FIG. 3 is a combination top plan view and circuit diagram of the automatic switching system of this invention.

The reader should now turn to FIG. 3. Here the same fan 50 is shown mounted to a bracket 67, but without the optional screen 68. In the alternative the fan itself can be mounted as shown in FIG. 4 to the rear wall 21 of the refrigerator. Air is intended to flow into space 37 via spaced vanes 72 and out of the space via slots 71S adjacent outwardly directed vanes 73.

In either case, wire 63 connects the fan to ground, while wire 66 electrically connects the other side of the fan, not to a manual rocker switch but rather to thermo switch #2, designated 61. Thermo switch 61 which is the replacement of FIG. 1's manual switch 51 is connected by wire 65 on one side thereof, to the second terminal of thermo switch #1, 62. The second terminal of the thermo switch 62 is connected by wire 64 to the 12 volt power source. Thus the two thermo switches are seen to be connected in series.

Switch 61 is disposed near a hot zone of the refrigerator itself, such as adjacent the heating element 24, not generally visible itself, but whose location is noted as 24 in FIG. 1 and in FIG. 4. The disposition can be by screws or tape or other known means for attaching as may be desired. This second thermo switch 61, has a different zonal range of operation than thermo switch #1, 62. The operative range of switch #2, 61 is preferably 130 degrees on, and 115 degrees off. But a 140–120 degree range is acceptable. Switch #1, 62 operates within the range of 110° F. on to 90° F. off. Since there are no manual controls present for one to forget to turn on, when the temperature reaches 130° F. or what ever temperature the thermo switch #2, 61 is set to operate at, the switch activates, and fan 50 is activated to dissipate the heat, if switch 62 is ALSO activated.

When the temperature in space 37 decreases to about 90 degrees, switch #1, element 62, which is often mounted adjacent said fan, turns off, and the fan 50 stops running due to the aforementioned series circuitry. When the temperature falls at the heating element 24, caused by manual deactivation of the refrigerator, thermo switch 1 takes control of the system, and turns off the fan at the low set point of switch #2, 61 i.e., at about 115 degrees F.

It is seen that there is nothing to set, nothing to forget. All one need do is turn on the refrigerator, and the heat build up will be automatically dissipated.

A solar powered refrigeration system, uses solar cells to charge a battery system, which may be 12 volt or some other voltage. But for purposes of this invention, a refrigerator operating on a solar power is to be treated the same as any other battery-based power system. The dual thermo switch system of this invention would be activated and deactivated in like manner as previously discussed.

It is seen therefore that switch system of this invention will automatically go on whenever the refrigerator is in use due to heat buildup.

As the temperature cools down, either due to inactivation of the refrigerator,—end of journey—or when the temperature cools down in area 37 during operation of the refrigerator, the heat exhaust system is turned off. This series wired electrical exhaust system, removes the needs for reminder notes or a light to turn off the manual actuated heat exhaust system. Of course when the RV is parked for storage, and the refrigerator is not in use, if there is a main 12 volt switch, it is turned off such that the exhaust system of this invention need not and does not operate.

The thermo switches discussed above are readily available in the marketplace from several vendors.

It is seen that I have developed a heat exhaust system that is designed to increase the efficiency of RV refrigerators, by aiding the heat transfer capability of the condensers thereof, without the need to remember to turn on or to turn off the system. By using the series wiring as employed herein, both switches S1 and S2 must be "on" to make the fan go on, but only one or the other of the two switches need be "off" to stop the fan from working. This is achieved by having the heating element of the turned on refrigerator activate S2, while the heated air in the air space behind the refrigerator activates S1. Since S2 turns on almost immediately clue to its proximity to the heater element, when the air space temperature reaches the "on" temperature of S1, the fan goes on. Assuming the refrigerator is maintained operative, as the heat dissipates from the fan's operation, when the temperature in the air space cools down, S1's "off" temperture is reached, and the fan goes off.

Turning off the refrigerator, causes S2 to cool to "off", so the fan goes off. If the refrigerator is off and there is still heat buildup in the air space behind the refrigerator, the fan will NOT come on.

Since certain changes may be made in the above device without departing from the scope of the invention herein involved, it is intended that all matter contained in the above description, shall be interpreted as illustrative and not in a limiting sense.

I claim:

1. An automatic switch controlled ventilation system for a recreational vehicle refrigerator, which refrigerator has a condenser and a heating element and which refrigerator is mounted, spaced from an outside wall of the vehicle, the operation of which refrigerator causes the heater element to build up heat in the space behind the refrigerator, thereby affecting the efficiency of the condenser, said ventilation system comprising:

a fan disposed in the space between the refrigerator and the outside wall of the vehicle, a pair of thermo switches, designated S1 and S2, switch S2 having a different and higher degree zonal range of operation than that of switch S1, the "on" temperature being at the top of the range and the "off" temperature being at the bottom of the range for each switch, said switches being electrically connected in series with each other and with said fan, and connected to a power source, said switch S2 being physically disposed adjacent the heating element of said refrigerator, and switch S1 also being disposed in the air space behind the refrigerator, whereby when the temperature of the heating element reaches the "on" temperature of switch S2, switch S2 turns on, and when and if, the temperature in the air space behind the refrigerator reaches the "on" temperature of S1, the switch S1 is activated and the fan turns on to dissipate the heat;

and wherein when said temperature in the air space behind the refrigerator decreases as the heat is dissipated, down to the "off" temperature of switch S1, the fan turns off.

2. The ventilation system of claim 1 further including air inlet means and air outlet means, both in fluid communication with the space behind the refrigerator.

3. The system of claim 1 wherein the operative range of switch S2 is about 130° F. on and about 115° F. off.

4. The system of claim 1 wherein the operative range of switch S1 is about 110° F. on and 90° F. off.

5. The system of claim 1 wherein the operative range of switch S2 is about 140° F. on and about 120° F. off.

6. An automatic switch controlled ventilation system for a recreational vehicle's power refrigerator, which refrigerator has a condenser and a heating element and which refrigerator is mounted, spaced from an outside wall of the vehicle, the operation of which refrigerator causes the heater (element to build up heat in the space behind the refrigerator, thereby affecting the efficiency of the condenser, said ventilation system comprising:

a fan disposed in the space between the refrigerator and the outside wall of the vehicle, a pair of thermo switches, designated S1 and S2, switch S2 having a zonal range of operation of from 140° F. "on" and 115° F. "off", said zonal range of operation for S2 being higher than that of switch S1, the "on" temperature being at the top of the range and the "off" temperature being at the bottom of the range for each switch, said switches being electrically connected in series with each other and with said fan, and connected to a power source, said switch S2 being physically disposed adjacent the heating element of said refrigerator, and switch S1 being disposed in the air space behind the refrigerator, whereby when the temperature of the heating element reaches the "on" temperature of switch S2, switch S2 turns on, and when and if the temperature in the air space behind the refrigerator reaches the "on" temperature of S1, the switch S1 is activated and the fan turns on to dissipate the heat;

and wherein when said temperature in the air space behind the refrigerator decreases as the heat is dissipated, down to the "off" temperature of switch S1, the fan turns off.

7. The system of claim 6 wherein the zonal range of operation of switch S1 is about 110° F. "on" and 90° F. "off".

8. The system of claim 1 further including air inlet means and air outlet means in fluid communication with said space behind the refrigerator.

9. A switched fan kit for removal of heat in the space between a powered recreational vehicle's refrigerator, and the outside wall of a recreational vehicle, which kit includes a fan, and a pair of thermo switches, designated S1 and S2, switch S2 having a different and higher degree zonal range of operation than that of switch S1, the "on" temperature being at the top of the range and the "off" temperature being at the bottom of the range for each switch, said switches being electrically connected in series with each other and with said fan, said kit being adapted for connection to a power source wherein the operative range of switch S2 is about 140° F. "on" and about 115° F. "off" and wherein the operative range of switch S1 is about 110° F. "on" and 90° F. "off".

10. The method of evacuating the heat generated from the operation of a recreational vehicle's refrigerator, from the space between the refrigerator and an outside wall of the vehicle which comprises:
  mounting a fan and a pair of thermo switches, each of which has a different operational range, in series, and to a power source in the space behind the recreational vehicle refrigerator, and
  automatically actuating the fan when both of said pair of thermo switches, reach their respective predetermined high temperature point, and automatically turning off said fan when one of said pair of thermo switches reaches a predetermined low temperature point.

11. An automatic switch controlled ventilation system for a recreational vehicle refrigerator, which refrigerator has a condenser and a heating element and which refrigerator is mounted, spaced from an outside wall of the vehicle, the operation of which refrigerator causes the heater element to build up heat in the space behind the refrigerator, thereby affecting the efficiency of the condenser, said ventilation system comprising:
  a fan disposed in the space between the refrigerator and the outside wall of the vehicle,
  a pair of thermo switches, designated S1 and S2, switch S2 having a different and higher degree zonal range of operation than that of switch S1, the "on" temperature being at the top of the range and the "off" temperature being at the bottom of the range for each switch, said switches being electrically connected in series with each other and with said fan, and connected to a power source,
  said switch S2 being physically disposed adjacent the heating element of said refrigerator, and switch S1 also being disposed in the air space behind the refrigerator,
  whereby when the temperature of the heating element reaches the "on" temperature of switch S2, switch S2 turns on, and when and if, the temperature in the air space behind the refrigerator reaches the "on" temperature of S1, the switch S1 is activated and the fan turns on to dissipate the heat;
  and wherein when the refrigerator is turned off, the heating element cools down to the "off" temperature of switch S2, the fan turns off, regardless of the temperature in the air space behind the refrigerator.

12. The ventilation system of claim 11 further including air inlet means and air outlet means, both in fluid communication with the space behind the refrigerator.

13. The system of claim 11 wherein the operative range of switch S2 is about 130° F. on and about 115° F. off and the operative range of switch S1 is about 110° "on" and about 90° "off".

* * * * *